(12) United States Patent
Jeon

(10) Patent No.: US 6,378,336 B1
(45) Date of Patent: Apr. 30, 2002

(54) METHOD FOR MANUFACTURING A DECORATED PLATE GLASS

(76) Inventor: Jae Seok Jeon, 1001, Donglim Apt. 258-16, Sinam-4dong, Dong-gu, Taegu (KR)

( * ) Notice: Subject to any disclaimer, the term of this patent is extended or adjusted under 35 U.S.C. 154(b) by 0 days.

(21) Appl. No.: 09/444,914

(22) Filed: Nov. 24, 1999

(30) Foreign Application Priority Data

Dec. 22, 1998 (KR) .......................................... 98-57965

(51) Int. Cl.⁷ .................. C03B 19/09; C03B 23/20; B05D 5/12
(52) U.S. Cl. ................. 65/17.3; 65/36; 65/43; 427/98
(58) Field of Search ........................ 65/17.3, 36, 43; 156/63, 89.11, 89.24; 427/98

(56) References Cited

U.S. PATENT DOCUMENTS 4,626,071 A * 12/1986 Wada et al. ................. 350/311

\* cited by examiner

*Primary Examiner*—Christopher A. Fiorilla
(74) *Attorney, Agent, or Firm*—Birch, Stewart, Kolasch & Birch, LLP

(57) ABSTRACT

A method for manufacturing a decorated plate glass, including the steps of (a) attaching crystal ice to the top surface of a plate glass with an adhesive; (b) heating the plate glass containing the crystal ice at a high temperature for a short period of time causing the crystal ice to melt on the plate glass; and (c) quick cooling the plate glass.

4 Claims, 3 Drawing Sheets

METHOD FOR MANUFACTURING A DECORATED PLATE GLASS

BACKGROUND OF THE INVENTION

Field of the Invention

The present invention relates to an improved method for manufacturing decorative plate glass and more particularly, to a method for decorating plate glass wherein crystal ice, e.g., glass powders, is applied to a glass plate where it is melted then rapidly cooled.

Description of the Invention

Various types of methods for manufacturing decorated plate glass are known in the art in which crystal ice is melted and attached (melt-stuck) to a plate glass in various designs. For example, crystal ice is attached or sprayed onto the surface of plate glass in a desired design, heated in an oven at a temperature of 550° C.–630° C., depending on the melting point of the crystal ice, for about 40–50 minutes and cooled slowly for about 1–2 hours depending on the thickness and the size of the plate glass.

Such a conventional, decorative plate glass is very beautiful and has artistic merit but suffers from a number of problems associated with the commercialization of the goods:

(1) It is not suitable for mass production and commercialization because it takes too long, e.g., at least 2–3 hours, to produce the product.

(2) During the cooling procedure the crystal ice settles down and loses its shape. Also, cracks are formed in the plate glass as well as in the crystal ice formed on the plate glass.

This phenomenon was noted by the inventor of the present invention during a study of the method of producing decorative plate glass. Thus, when crystal ice 4 is initially heated after it is sprayed or attached to the surface of a plate glass 2' by placing it into a heating oven as shown in FIG. 1, it is not slowly melted to the melting temperature according to the melting point of the crystal ice 4', but rather it is melted quickly in a few seconds (FIG. 2). In this procedure, the crystal ice 4 develops surface tension as shown in FIGS. 3 and 4 and pulls on itself, and coheres together on the surface of the plate glass 2' like a vapor drop, with some designs 6 being formed as shown in FIG. 4. At this moment, the designs are very beautiful and highly transparent.

However, as time passes, the coherent design 6' slowly spreads out in the sidewise direction, and accordingly, the design 6' becomes distorted and loses its transparency. Therefore, in the conventional manufacturing method, the shape of the design 6' on the plate glass 2' and transparency thereof have not been satisfactory because cooling was not effected using the peak point phenomenon, i.e., the peak point at where the crystal ice melts.

Also, cracks 8, which deal a fatal blow to the strength of the plate glass appeared in the slow cooling procedure of the heated plate glass 2' as in FIG. 5. This is due to the difference in the coefficient of contraction between the crystal ice 4 and plate glass 2' when the completely heated plate glass 2' is slowly cooled.

As shown in FIG. 6, when the melt design 6' of the crystal ice 4' and plate glass 2' are slowly cooled, cracks 8 appears in the plate glass 2' and in the design 6 because of their different coefficient of contraction. Such cracks 8 reduce the strength of the plate glass 2', and this phenomenon is affected differently by the thickness of the original plate glass and the cooling time of the plate glass in the processing steps.

The following Table I shows the state in which cracks 8 penetrate into the plate glass 2.

TABLE I

| Thickness | Cooling Time (min.) | Depth Of The Cracks Which Penetrate Into The Plate Glass | Penetration Ratio (%) |
|---|---|---|---|
| 3 mm | 90 minutes | 0.21 mm | 7% |
| 4 mm | 110 minutes | 0.14 mm | 3.5% |
| 5 mm | 120 minutes | 0.10 mm | 2% |
| 8 mm | 150 minutes | 0.04 mm | 0.5% |
| 10 mm | 170 minutes | 0.04 mm | 0.4% |

As shown above in Table I, the penetrating ratio and cooling time of the plate glass 2' are inverse, relative to each other. And as the thickness of the glass is increased and the cooling time is increased, the effect of cracks 8 formed in the crystal ice 4', on the plate glass is minimized.

Comparing the strength of cracked plate glass used for decorative purposes and that of common plate glass, there is a big difference as shown in the following Table II.

TABLE II

| | Dropping Height | |
|---|---|---|
| Classification | Common Plate Glass | Plate Glass On Which Cracks Appear |
| 3 mm | 20 cm | None Testable (directly destroyed) |
| 4 mm | 50 cm | None Testable (directly destroyed) |
| 5 mm | 75 cm | 15 cm |
| 8 mm | 120 cm | 40 cm |
| 10 mm | 150 cm | 70 cm |

Testing method: Drop Test for Impact
Testing standard: KSL 2002
Weight of testing specimen: 1,040 g
Size of testing plate glass: 300 mm×300 mm As shown in the above Table II, a plate glass 2' having a thickness of under 4 mm is not usable because of the cracks 8 which occurred when the crystal ice 4' was slowly cooled. Even 5 mm plate glass showed only about 20% of the strength of common plate glass. Because of these problems, and though many methods of forming various designs with crystal ice 4' have been heretofore proposed, there are still many limitations and many difficulties in producing commercially desirable products.

SUMMARY OF THE INVENTION

Accordingly, it is an object of the present invention to provide a method for manufacturing decorative plate glass which eliminates the above problems encountered in conventional methods for manufacturing decorative plate glass.

Another object of the present invention is to provide an improved method for manufacturing decorative plate glass comprising the steps of melting crystal ice (glass powder) and causing it to cohere on the surface of a plate glass at a temperature of about 650–680° C. for about 5–6 minutes and rapidly cooling the composite to produce an ornamental and non-cracked plate glass.

A further object of the present invention is to provide a method for decorating plate glass comprising the steps of spraying or attaching crystal ice on the plate glass placing the composite into a heating oven where it is heated to the melting temperature of the crystal ice, and then rapidly transferring the composite structure to a cooling device where it is quick cooled at the moment (peak time) when the crystal ice is melted and cohered to the plate glass.

Still another object of the present invention is to provide a method for decorating plate glass which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiment of the invention, are given by way of illustration only, since various changes and modifications within the spirit and scope of the invention will become apparent to those skilled in the art from this detailed description.

Briefly described, the present invention is directed to a method for manufacturing a decorative plate glass, comprising the steps of attaching crystal ice to the surface of a plate glass so as not to be separated; placing the plate glass containing the crystal ice into a heating oven; melting and causing the crystal ice to cohere on the surface of the plate glass; and rapidly transferring the composite structure to a cooling device for quick cooling to produce a decorated plate glass without any cracks. Since crystal ice is melted and caused to cohere to the plate glass in a very short time, the overall strength is much improved, saving time and energy in its manufacture and increasing its productivity and commercialization.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
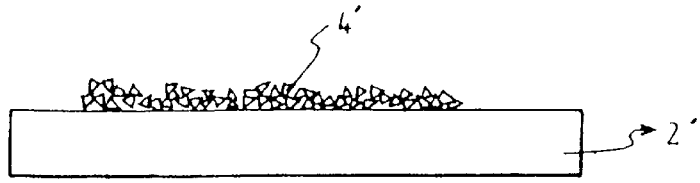
FIG. 1 is a front view of crystal ice attached to a plate glass using a conventional method for manufacturing a decorative plate glass.
Figure 2:
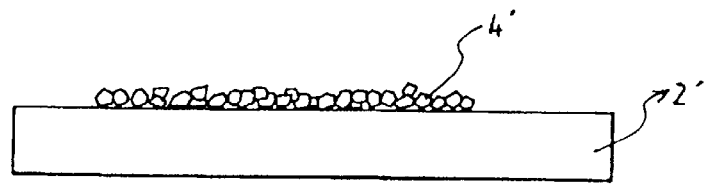
FIG. 2 is a front view showing the melting of crystal ice on a plate glass using a conventional method.
Figure 3:
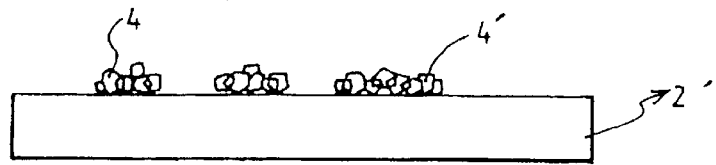
FIG. 3 is a front view of bundles of melted crystal ice disposed on a plate glass using a conventional method, which are beginning to rise up due to the surface tension.
Figure 4:
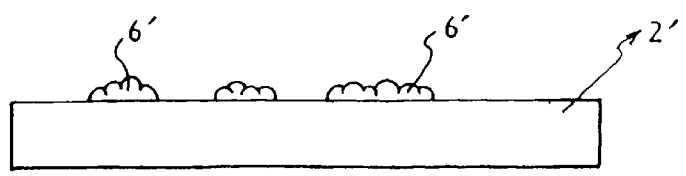
FIG. 4 is a front view of the bundle of melting crystal ice disposed on the plate glass using a conventional method, which cohere together in the state of its peak melting point.
Figure 5:
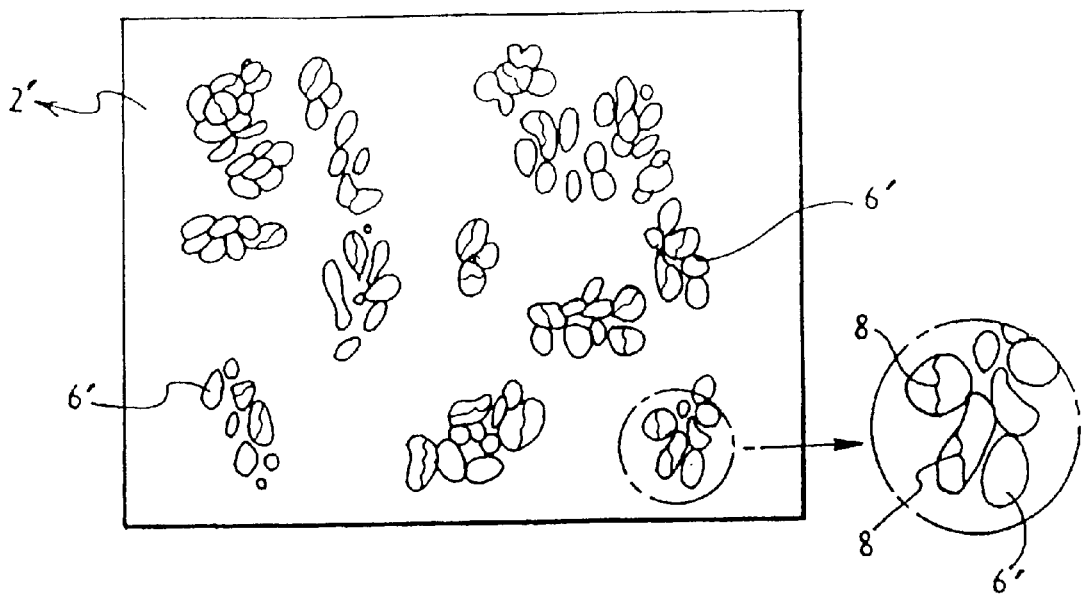
FIG. 5 is a top plan view of the bundle of decorated crystal ice disposed on a plate glass using a conventional method, which includes cracks formed in the crystal ice.
Figure 6:
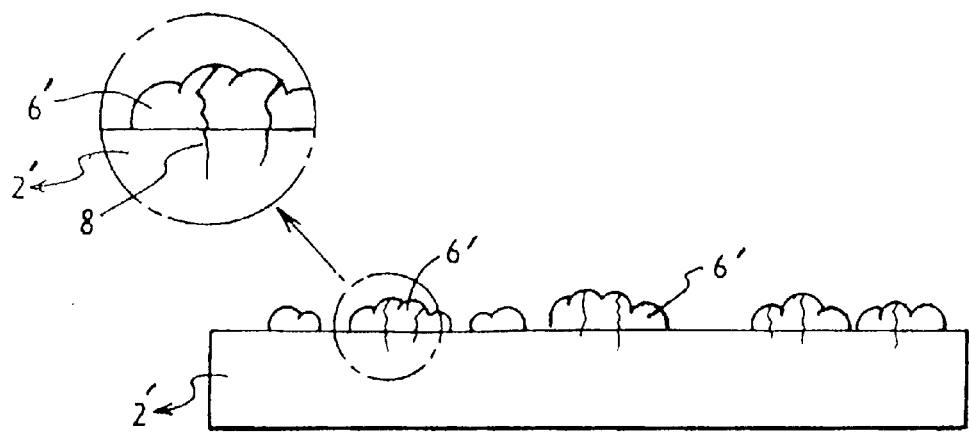
FIG. 6 is a sectional view of FIG. 5.
Figure 7:
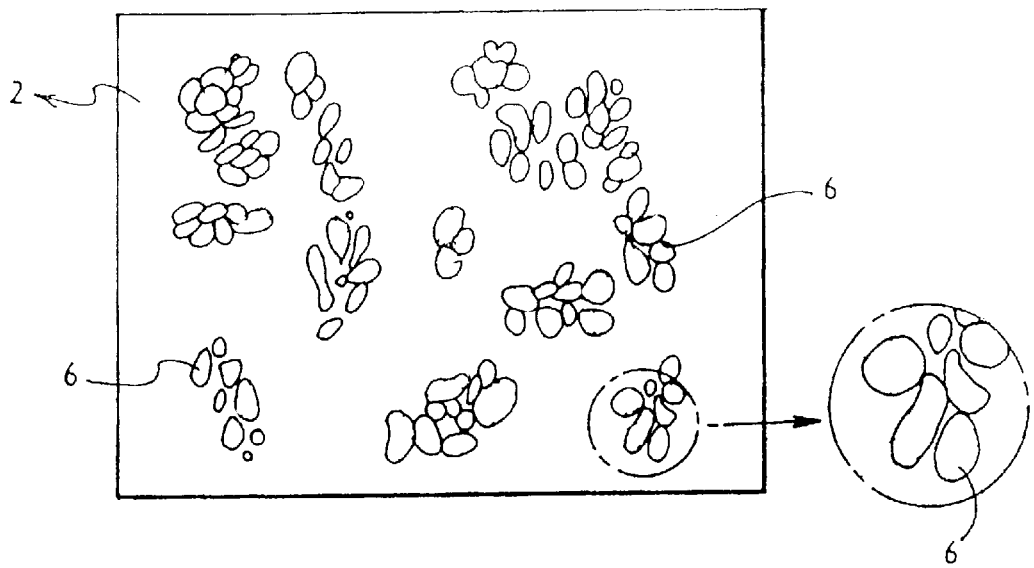
FIG. 7 is a top plan view of a bundle of decorated crystal ice disposed on a plate glass according to the present invention wherein the decorated crystal ice does not include cracks.
Figure 8:
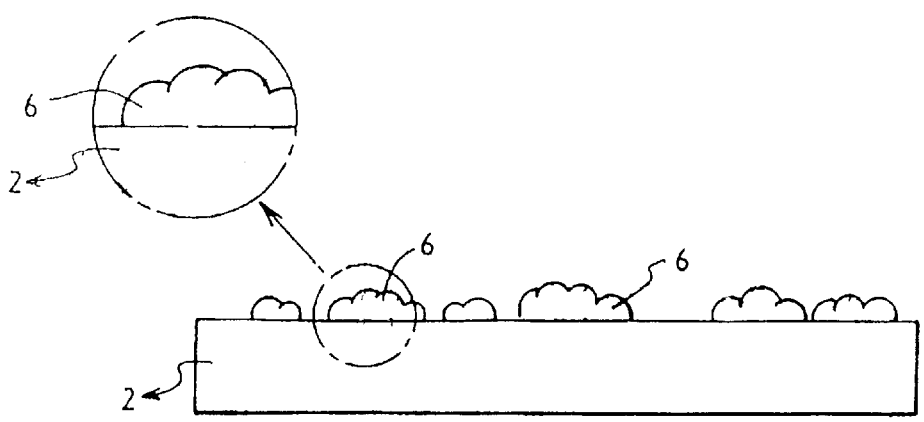
FIG. 8 is a sectional view of FIG. 7.

Referring now in detail to the drawings for the purpose of illustrating the preferred embodiments of the present invention, the method for manufacturing a decorated plate glass as shown in FIGS. 1 to 3 and 7 and 8 comprises the steps of attaching crystal ice 4' to the surface of a plate glass 2; placing the plate glass 2 containing the crystal ice 4' into a heating oven; melting and cohering the crystal ice 4' on the plate glass 2 to produce bundles of designed crystal ice 6; and transferring the plate glass containing the crystal ice to a cooling device to rapidly cool the composite structure to produce a non-cracked and ornamental plate glass 2 (FIGS. 7 and 8).

When the composite structure is rapidly cooled, as stated above, the quick cooling is started at the peak point where the crystal ice 4' melts. This is the state where designs are formed like vapordrops. The designed crystal ice 6 formed on the plate glass 2 can be maintained as it is and transparent, like a vapordrop. The crystal ice 4' on the plate glass cannot affect the body plate glass 2 because it is solidified so quickly from its liquid form, whereby the molecular structure is internally disrupted when it is rapidly cooled.

Therefore, to practice the present invention, there should be provided an elaborate temperature regulating device in the heating oven where crystal ice 4' and plate glass 2 are heated. And the heating must be stopped when the crystal ice melt reaches its peak point, at which time it is rapidly transferred to a cooling device, and quickly cooled. The decorative plate glass 2 of the present invention is thus produced.

The present invention will now be described in more detail in connection with the following examples which should be considered as being exemplary and not limiting of the present invention.

EXAMPLE 1

Method of Using an Automatic Horizontal Tempering Machine

In this example, a 5 mm transparent plate glass and crystal ice having a melting point of 630° C.–650° C. are utilized. The process steps comprise:

(a) attaching crystal ice to the surface of the plate glass with adhesives in a desired configuration to form a composite structure;

(b) setting the heating oven at a temperature of about 650° C.–680° C. for a period of heating time of 3–4 minutes. Test data will indicate the desired heating temperature and heating time in the heating oven;

(c) placing the composite in a horizontal tempering machine for heat treatment at a desired temperature and time period;

(d) the crystal ice 4' on the plate glass 2 reaches its peak point when it is formed into the transparent design which looks like a vapordrop; and (e) at this time, the plate glass 2 is transferred to a cooling device very rapidly where it is cooled very quickly in 20–30 seconds with a cooling apparatus like an air blower.

When the heated plate glass 2 is quickly cooled, the design which is formed on the plate glass 2 is solidified, into a beautifully shaped transparent vapordrop, and the crystal ice 4' which is melt attached to the surface of the plate glass 2 is rapidly cooled and changes from a liquid state to a solidified state. Thus, there is no effect on the plate glass 2 from the crystal ice 4', no loss of strength and, in fact, becomes stronger.

When the plate glass 2 on which the crystal ice 4' is melt-attached is heated in the horizontal tempering machine, the oxygen supply line should be locked because the jet oxygen stream can change the design of the crystal ice 4' which is melted on the plate glass 2.

The body plate glass 2 on which the crystal ice is melt cohered is changed in its property to one of three different types, i.e., semi-tempered glass, completely tempered glass, and weakly tempered glass, according to the cooling method. For this practice, it takes a very short time to manufacture the plate glass 2 for decoration.

EXAMPLE 2
Method of Using a Semi-Automatic Vertical Tempering Machine

In this example, a 10 mm or 12 mm plate glass 2 and crystal ice 4' having a melting point of 630° C.–650° C. are used, and the method of the present invention is practiced by the following steps:

(a) crystal ice 4' is attached by conventional methods on the plate glass 2 in a desired configuration with an adhesive. The composite is placed into a vertical tempering machine;

(b) at this time the vertical tempering machine is set at a temperature of 650° C.–680° C. for a heating time of 5–6 minutes;

(c) the composite is then heated in the tempering machine whereby, the crystal ice 4' is melted and coheres on the plate glass 2; and (d) the composite is then rapidly transferred to a cooling device where it is quickly cooled with an air conditioner or an air blower.

In this example, the plate glass 2 becomes a semi-tempered glass plate or a completely tempered glass plate depending on the cooling method, including the volume of air and the pressure.

EXAMPLE 3
Method of Using a Common Heating Oven

In this example, a 5 mm transparent plate glass 2 and crystal ice 4' having a melting point of between 530° C.–580° C. are used, and the invention is practiced in the following manner:

crystal ice 4' which is already attached to the surface of the plate glass 2 in a desired configuration is placed into a heating oven. The crystal ice—plate glass composite is heated slowly for between 3–5 minutes, until it reaches the melting peak point of the crystal ice 4'. The composite structure is then quickly cooled in 10–30 seconds in a cooling apparatus which utilizes an air compressor or an air blower.

According to the present invention, when manufacturing a plate glass 2 for decoration, the crystal ice 4' is melted to a peak point and quickly cooled and cohered to the surface of the plate glass, forming beautiful, transparent designs. In the formation of the crystal-like designs, the crystal ice 4' which undergoes melting quick cooling, is molecularly reoriented within itself as it is solidified. The strength of the plate glass 2 is not adversely effected but rather is strengthened.

The following Table III is a comparative chart showing the relative strength of various plate glass.

TABLE III

| | Dropping Height | | |
| Classification | Common Plate Glass | Slowly Cooled Plate Glass For Decoration | Quickly Cooled Plate Glass For Decoration |
| --- | --- | --- | --- |
| 3 mm | 20 cm | None-Testable (directly destroyed) | 40 cm |
| 4 mm | 50 cm | None-Testable (directly destroyed) | 60 cm |
| 5 mm | 75 cm | 15 cm | 100 cm |
| 8 mm | 120 cm | 40 cm | 160 cm |
| 10 mm | 150 cm | 70 cm | 200 cm |

Testing method: Drop Test for Impact
Testing standard: KSL 2002
 Weight of testing specimen: 1,040 g
 Size of testing plate glass: 300 mm×300 mm
 Besides the strengthening effect, the method of the present invention saves both time and energy in the manufacture of decorative plate glass 2, and thus, enables mass production and commercialization.

The invention being thus described, it will be obvious that the same may be varied in many ways. Such variations are not to be regarded s a departure from the spirit and scope of the invention, and all such modifications as would be obvious to one skilled in the art are intended to be included in the scope of the following claims.

What is claimed is:

1. A method for manufacturing a decorated plate glass, comprising the steps of:
 (a) attaching crystal ice to the top surface of a plate glass with an adhesive;
 (b) heating the plate glass with the crystal ice in a horizontal tempering machine at a temperature of about 650–680° C. for about 3–4 minutes, causing the crystal ice to melt on the plate glass; and
 (c) quick cooling the plate glass with an air compressor or an air blower.

2. The method of claim 1, wherein the quick cooling is initiated at a peak point where the crystal ice melts.

3. The method of claim 1, wherein the quick cooling is effected in 20–30 seconds.

4. A method for manufacturing a decorated plate glass, comprising the steps of:
 (a) attaching crystal ice to the top surface of a plate glass with an adhesive;
 (b) heating the plate glass containing the crystal ice in a vertical tempering machine at a temperature of about 650–680° C. for about 5–6 minutes causing the crystal ice to melt on the plate glass; and
 (c) quick cooling the plate glass for about 20–30 seconds using an air compressor or an air blower.

* * * * *